(12) United States Patent
Igarashi

(10) Patent No.: US 6,865,077 B2
(45) Date of Patent: Mar. 8, 2005

(54) METHOD OF COOLING SYSTEM FOR A PERSONAL COMPUTER AND PERSONAL COMPUTER

(75) Inventor: Takeshi Igarashi, Isehara (JP)

(73) Assignee: Hitachi, Ltd., Tokyo (JP)

( * ) Notice: Subject to any disclaimer, the term of this patent is extended or adjusted under 35 U.S.C. 154(b) by 164 days.

(21) Appl. No.: 10/105,298

(22) Filed: Mar. 26, 2002

(65) Prior Publication Data

US 2003/0039097 A1 Feb. 27, 2003

(30) Foreign Application Priority Data

Aug. 22, 2001 (JP) ........................................ 2001-251526

(51) Int. Cl.[7] ................................................ H05K 7/20
(52) U.S. Cl. ......................... 361/687; 361/695; 361/700; 165/104.33; 62/3.7
(58) Field of Search ................................. 361/687, 689, 361/695, 697, 699, 715; 174/15.1, 16.1; 165/173, 185, 104.21, 80.2, 80.3, 104.33, 80.4; 62/259.2, 3.2, 3.3, 3.6, 3.7; 259/1, 428

(56) References Cited

U.S. PATENT DOCUMENTS

| | | | |
|---|---|---|---|
| 5,323,847 A * | 6/1994 | Koizumi et al. ........ | 165/104.33 |
| 5,646,824 A * | 7/1997 | Ohashi et al. .............. | 361/699 |
| 5,757,615 A * | 5/1998 | Donahoe et al. ............ | 361/687 |
| 5,881,298 A * | 3/1999 | Cathey ....................... | 713/324 |
| 5,884,049 A * | 3/1999 | Atkinson .................... | 710/303 |
| 5,898,569 A * | 4/1999 | Bhatia ........................ | 361/700 |
| 6,084,769 A * | 7/2000 | Moore et al. ............... | 361/687 |
| 6,109,039 A * | 8/2000 | Hougham et al. ............ | 62/3.7 |
| 6,118,654 A * | 9/2000 | Bhatia ........................ | 361/687 |
| 6,122,167 A * | 9/2000 | Smith et al. ................. | 361/687 |
| 6,166,907 A * | 12/2000 | Chien .......................... | 361/699 |
| 6,172,871 B1 * | 1/2001 | Holung et al. .............. | 361/687 |
| 6,181,553 B1 * | 1/2001 | Cipolla et al. .............. | 361/687 |
| 6,196,003 B1 * | 3/2001 | Macias et al. ................ | 62/3.7 |
| 6,219,233 B1 * | 4/2001 | Moore et al. ............... | 361/687 |
| 6,239,970 B1 * | 5/2001 | Nakai et al. ................. | 361/695 |
| 6,276,448 B1 * | 8/2001 | Maruno ....................... | 165/185 |
| 6,288,896 B1 * | 9/2001 | Hsu ............................. | 361/687 |
| 6,353,536 B1 * | 3/2002 | Nakamura et al. .......... | 361/686 |
| 6,407,916 B1 * | 6/2002 | Konstad ...................... | 361/687 |
| 6,445,580 B1 * | 9/2002 | Cohen et al. ................ | 361/687 |
| 6,453,378 B1 * | 9/2002 | Olson et al. ................. | 710/304 |
| 6,459,575 B1 * | 10/2002 | Esterberg .................... | 361/687 |
| 6,487,073 B2 * | 11/2002 | McCullough et al. ....... | 361/687 |
| 6,519,146 B2 * | 2/2003 | Nagashima et al. ......... | 361/687 |
| 6,560,104 B2 * | 5/2003 | DeHoff et al. .............. | 361/687 |
| 6,563,703 B2 * | 5/2003 | Xie .............................. | 361/687 |
| 6,567,262 B2 * | 5/2003 | Meir ........................... | 361/676 |
| 6,601,179 B1 * | 7/2003 | Jackson et al. ............. | 713/322 |
| 6,646,874 B2 * | 11/2003 | Pokharna et al. ........... | 361/687 |
| 2002/0105783 A1 * | 8/2002 | Kitahara ...................... | 361/695 |

FOREIGN PATENT DOCUMENTS

| | | | | |
|---|---|---|---|---|
| JP | 11238984 A | * | 8/1999 | ............ H05K/7/20 |
| JP | 2001044679 A | * | 2/2001 | ............ H05K/7/20 |

* cited by examiner

*Primary Examiner*—Michael Datskovsky
(74) *Attorney, Agent, or Firm*—Antonelli, Terry, Stout & Kraus, LLP

(57) ABSTRACT

A personal computer provided with heat-generating parts such as a CPU, a cooling unit that releases the heat generated by the heat-generating part to the outside of the personal computer has a container structure so that the cooling liquid in the interior does not leak to the outside. Also, part of the container structure is provided with a heat connection part for receiving the heat transferred from the outside of the cooling unit. Furthermore, there is provided means of heat transfer for transferring the heat generated by the heat-generating part to the cooling unit, one end of this means of heat transfer being thermally connected to the heat connection part of the cooling unit and the other end thereof being thermally connected to the heat-generating part. This prevents troubles in the personal computer due to the moisture permeation of the cooling liquid of cooling unit and leakage of the cooling liquid. Also, disassembly and assembly is made easy by forming the cooling unit as a separate structure.

10 Claims, 6 Drawing Sheets

METHOD OF COOLING SYSTEM FOR A PERSONAL COMPUTER AND PERSONAL COMPUTER

BACKGROUND OF THE INVENTION

The present invention relates to an information processing system or a personal computer and, more particularly, to a personal computer in which liquid cooling technology is used in the heat release mechanism of heat-generating parts.

In the cooling of conventional information processing system such as personal computers, a metal plate or heat pipe is interposed between a heat-generating member within the personal computer and a metal frame wall, and the heat-generating member is thermally connected to the metal frame wall, whereby the heat generated by the heat-generating part is released through the metal frame wall. Furthermore, by installing a fan on the metal frame wall, the air in the personal computer is exhausted, whereby forced air cooling is performed.

The main heat-generating part of an information processing system or a personal computer is the central processing unit (hereinafter referred to as a CPU) of the main part of the personal computer. Due to the heat generation from this CPU the temperature of the interior of the personal computer rises, with the result that the operation of the CPU may sometimes become abnormal, that the operation of other circuits of the personal computer may sometimes become unstable, and that thermal deformation of mechanism may sometimes be caused.

In particular, as the operating frequency of the CPU becomes higher, the amount of heat release has been recently become increased. In order to efficiently release the generated heat that has thus increased to the outside, there exists a cooling structure of liquid cooling method in which a cooling liquid is caused to circulate within the personal computer. However, electronic parts used in the personal computer has the low moisture resistance. For this reason, there is a fear of a decrease in the life and reliability of parts due to the moisture permeation of the cooling liquid (moisture permeation from a rubber tube or from connections made of rubber and the like in a metal tube) or due to the leakage of the cooling liquid.

SUMMARY OF THE INVENTION

The object of the invention is to provide safety and reliability that are not obtained from prior art technique in the cooling system using a cooling liquid method of an information processing system or a personal computer. To achieve this object, the following structural features are provided in the invention First, the cooling structure using liquid cooling method of a personal computer will be described below by referring to FIG. 6. A water jacket (W/J) 1 is disposed on a CPU, which is the main heat-generating part of the personal computer. This water jacket 1 is connected to a pump 4 via a tube 3, which is filled with a cooling liquid, and the cooling liquid is caused to circulate through the tube 3 by means of the pump 4. In order to raise the heat release effect, the tube 3 is disposed in a zigzag form in the interior of the personal computer. Heat generated from the CPU is conducted to the water jacket 1 and circulates through the tube 3, which is disposed within the personal computer and uses the cooling liquid as a heat medium. While the cooling liquid is circulating through the tube 3, heat is released to the outside of the personal computer via the tube 3, with the result that the cooling liquid is cooled again.

The personal computer of the invention comprises: a heat transfer part, which receives the heat generated from a heat-generating part within the personal computer and releases the heat to the outside of the personal computer; a main body of the personal computer, which is provided with a connector for establishing an electric connection; and a cooling unit, which is provided with a heat connection head for receiving the generated heat transferred from the heat-generating part from the heat transfer part, a tube connected to the heat connection head and filled with a cooling liquid, and a pump for circulating the cooling liquid, and which has a container structure so that the cooling liquid in the interior does not leak to the outside.

Also, the personal computer of the invention comprises: a heat transfer part, which receives the heat generated from a heat-generating part within the personal computer and releases the heat to the outside of the personal computer; a main body of the personal computer, which is provided with a connector establishing an electric connection; and a cooling unit, which is provided with a heat connection head for receiving the generated heat transferred from the heat-generating part from the heat transfer part, a tube connected to the heat connection head and filled with a cooling liquid, and a pump for circulating the cooling liquid. The cooling unit is constructed separately from the main body of the personal computer and can at the same time, be attached to and detached from the main body of the personal computer.

Also, in the personal computer, the cooling unit has the same outside shape as any of a battery pack or a drive unit such as a CD-ROM, and other extension units so that the cooling unit and battery pack or drive unit such as a CD-ROM or other extension units can be exclusively mounted in the same place of the main body of the personal computer.

Other objects, features and advantages of the invention will become apparent from the following description of the embodiments of the invention taken in conjunction with the accompanying drawings.

DETAILED DESCRIPTION OF THE PREFERRED EMBODIMENTS

Figure 1A:
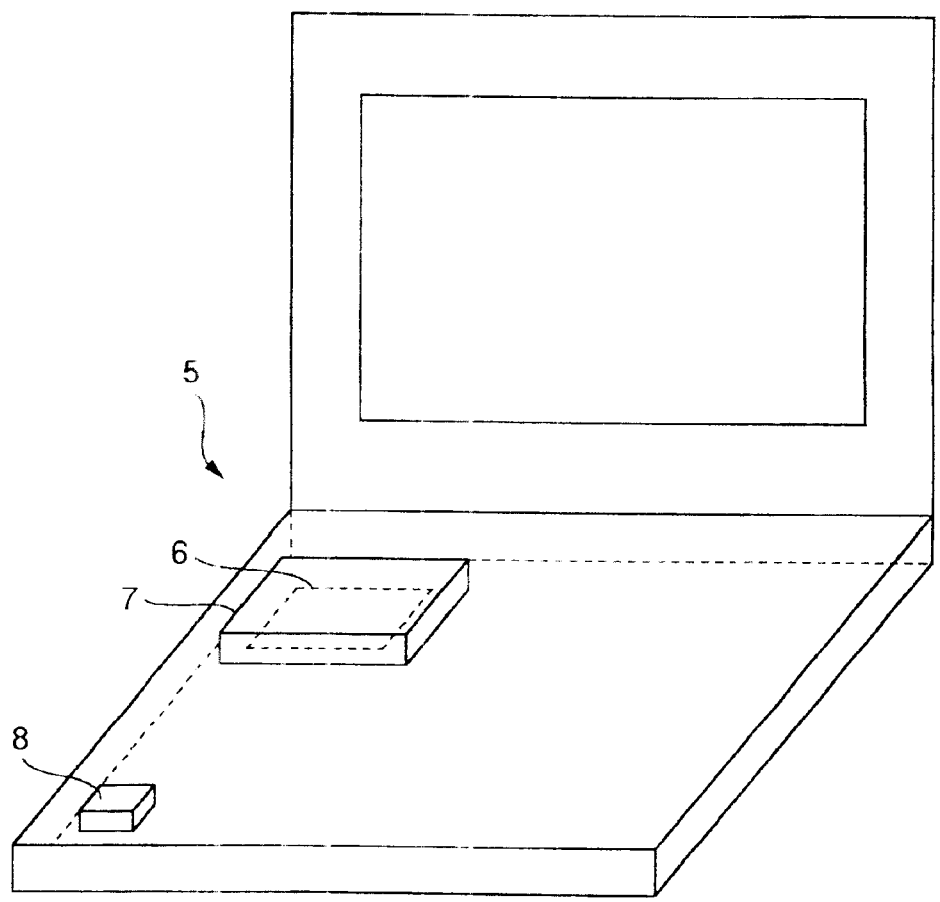
FIG. 1A is a schematic representation of a general structure of a personal computer in a first embodiment of the invention in which a cooling mechanism using liquid cooling method is employed.

FIG. 1A is a schematic representation of a general structure of an information processing system or a personal computer in a first embodiment of the invention in which a cooling mechanism using liquid cooling method is employed. And FIG. 1B is a schematic representation of a general structure of a cooling unit of the personal computer shown in FIG. 1A.

Figure 1B:
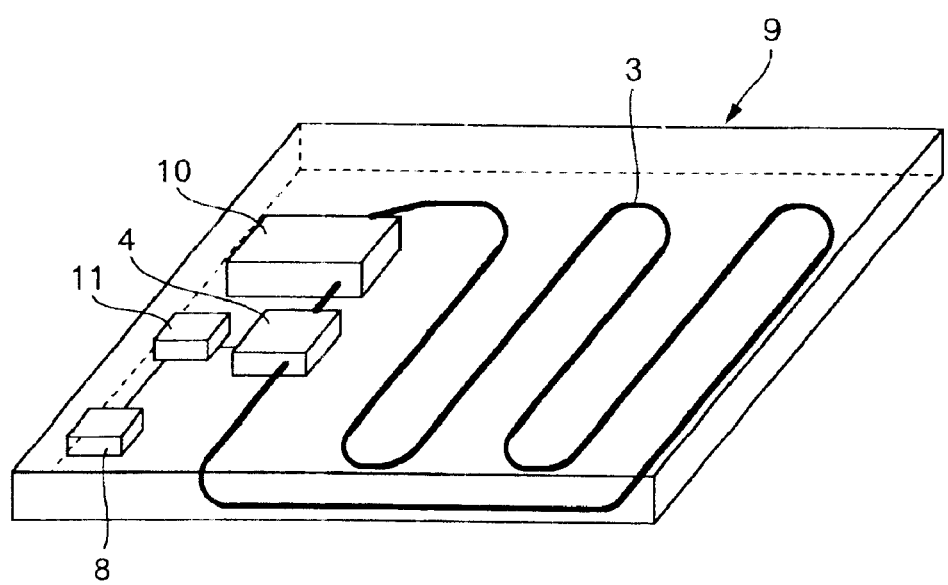
FIG. 1B is a schematic representation of a general structure of a cooling unit of the personal computer shown in FIG. 1A.

A shown in FIGS. 1A and 1B, the personal computer of the invention comprises a CPU 6, which is the main heat-generating part, a main body 5 of the personal computer, in which a display part is provided, and a cooling unit 9, which can be connected to the lower part of the main body 5 of the personal computer. Heat from the CPU 6 disposed in the main body 5 of the personal computer is transferred to a connection head 10 within a cooling unit 9 via a heat-receiving head 7. The connection head 10 is connected to a tube 3 which is arranged on the bottom surface of the cooling unit 9 in a zigzag form and filled with a cooling liquid. A pump 4 is installed in the route of the tube 3 to circulate the cooling liquid. Generated heat received at the connection head 10 is thermally diffused to the interior of the cooling unit 9 by the cooling liquid of the tube 3. At this time, the heat is released to the outside from the opposite surface of the main body 5 of the personal computer.

Figure 2A:
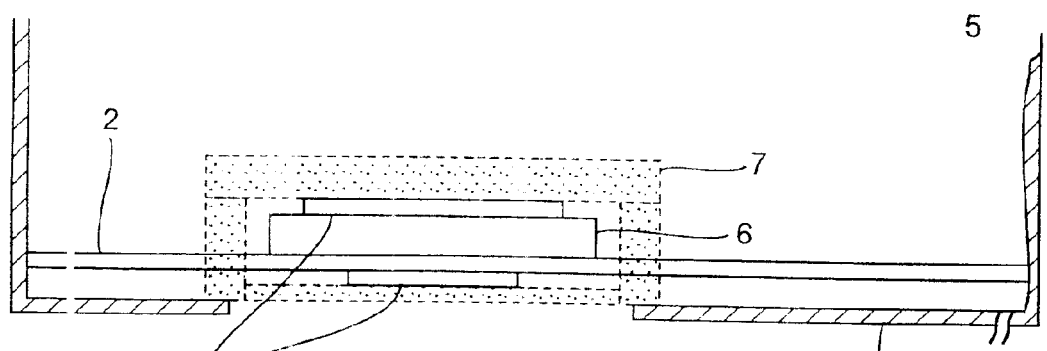
FIG. 2A is a sectional view of the connection structure of the heat transfer part between the main body of the personal computer and the cooling unit in the first embodiment of the invention.
Figure 2B:
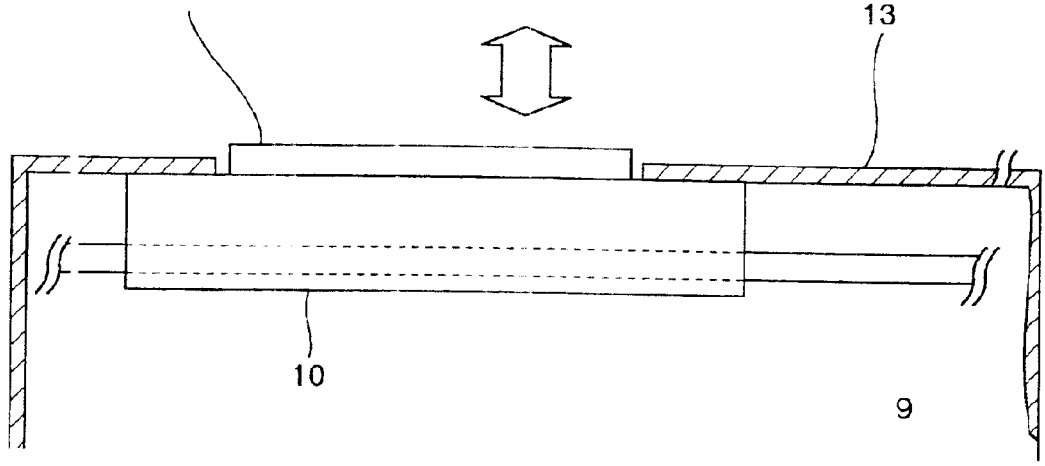
FIG. 2B is a plan view of the connection structure of the heat transfer part between the main body of the personal computer and the cooling unit shown in FIG. 2A.

FIGS. 2A and 2B show the connection structure of the heat transfer part between the main body 5 of the personal computer and the cooling unit 9 in this first embodiment of the invention. As shown in FIGS. 2A and 2B, the CPU 6 disposed on a mother board of the main body 5 of the personal computer is connected to the heat-receiving head 7 via a heat-conducting sheet 12. The heat-receiving head 7 is shaped in such a way that it sandwiches the mother board 2 from the top and bottom of the mother board through an opening formed in the mother board. In order to ensure the heat release efficiency of the CPU 6, the CPU 6 is connected to the heat-receiving head 7 via the heat-conducting sheet 12 also on the reverse side of the mother board 2 on the side of the cooling unit 9.

A cover 13 of the portion where the heat-receiving head 7 on the bottom surface of the frame of the main body 5 of the personal computer is disposed has an opening in its structure. When the cooling unit 9 is attached to the main body 5 of the personal computer, the connection head 10 of the cooling unit 9 is disposed in a position just beneath the heat-receiving head 7. When the main body 5 of personal computer and the cooling unit 9 are connected together, the connection head 10 is connected to the heat-receiving head 7 within the main body 5 of personal computer via the heat-conducting sheet 12. The cover 13 has a structure in which the portion of the top surface of cooling unit 9 where the connection head 10 is disposed also opens during the connection of the main body 5 to the personal computer.

As is apparent from FIGS. 1A and 1B, the area in which the cooling liquid circulates is limited to the interior of the cooling unit 9, and even if moisture permeation and cooling liquid leakage occur from the pump 4, tube 3, connection head 10 and their connecting portions, moisture does not permeate into the main body 5 of the personal computer. Furthermore, in spite of the adoption of a cooling structure using liquid cooling method which requires a complex structure, it is needless to say that the disassembly and assembly of the main body 5 of the personal computer is the same as that of the prior art, because any of parts constituting the cooling structure using liquid cooling method are not built in the main part 5 of the personal computer.

Now another example of the heat-receiving head 7 shown in FIGS. 1 and 2 will be described below. The heat-receiving head 7, which is made of a heat-conducting material such as aluminum and copper, conducts the heat generated in the CPU 6 to the connection head 10. In addition to this design, a heat pipe capable of transferring a great deal amount of heat than that by heat conduction may be used. In this case, the liquid in the heat pipe vaporizes in a high-temperature region that connects to the CPU 6, and the liquefaction of the gas occurs in a low-temperature region on the side of the connection head 10. By ensuring that the liquid flows from a low-temperature side to a high-temperature side and that the gas flows in the reverse direction, the heat generated in the CPU 6 conducts by the heat of vaporization.

Figure 3:
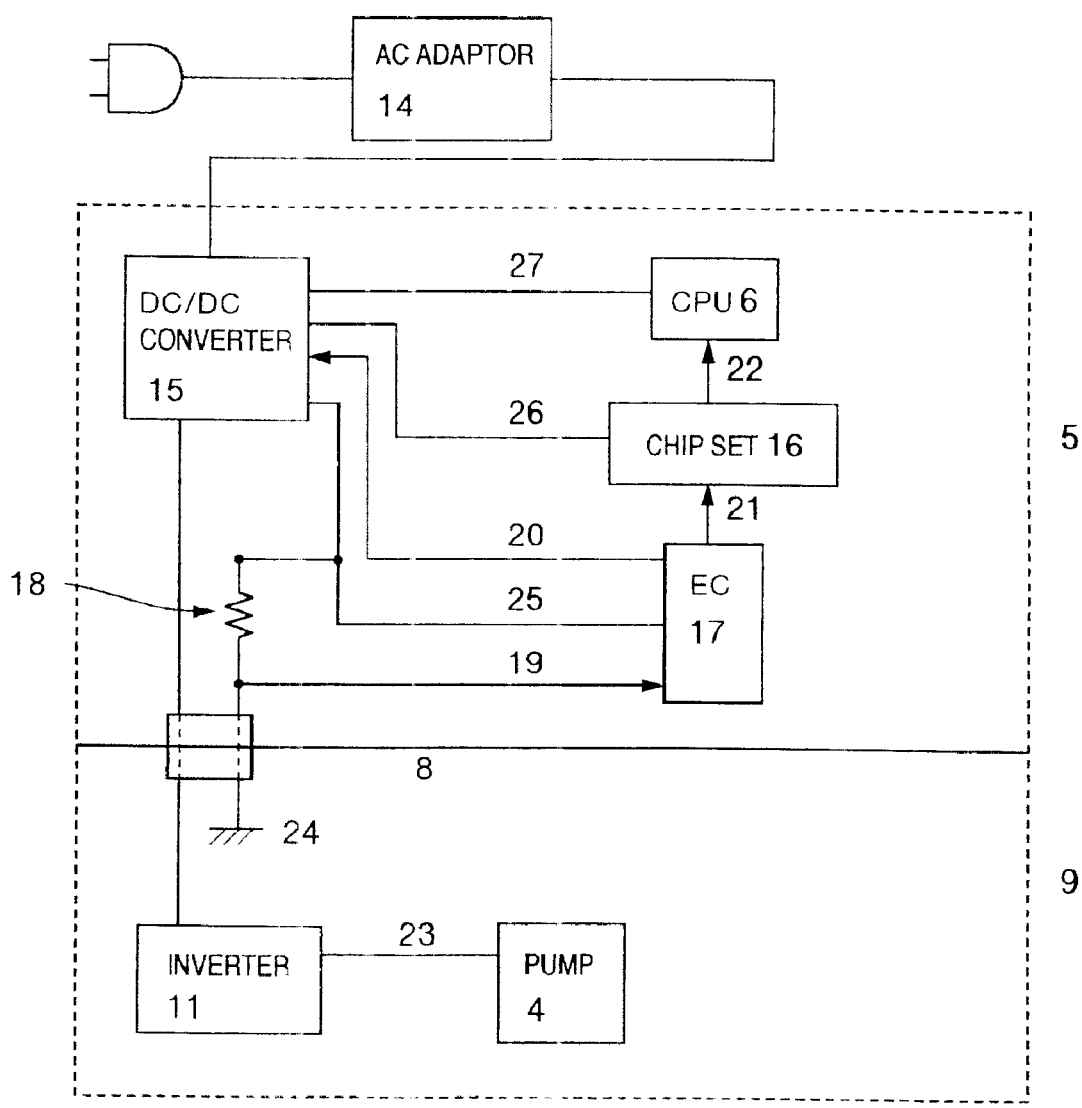
FIG. 3 is a diagram of an electric circuit of a personal computer in the first embodiment of the invention.

FIG. 3 is a schematic diagram of an electric circuit of a personal computer in the first embodiment of the invention. Commercial power is converted by an AC adapter 14 to DC power and supplied to the main body 5 of the personal computer. A DC/DC converter 15 of the main body 5 of the personal computer converts the DC power to the operating power of each part and supplies the power to each part. The output power of the DC/DC converter 15 is supplied also to the cooling unit 9 via a connector corresponding to the connector 8 for the main body of the personal computer and the cooling unit shown in FIG. 1. A pump 4 for circulating the cooling liquid within the cooling unit 9 is driven by use of the power supplied from the connector 8. For example, when a piezoelectric pump is used as the pump 4, the power (DC) supplied from the connector 8 is converted to AC power by means of an inverter 11 and this AC power is supplied to the pump 4.

Furthermore, it is ensured that a cooling unit detection signal 19 (a signal indicating that the cooling unit has been connected to the main body of the personal computer) is given to this connector 8. And within the main body 5 of the personal computer, the cooling unit detection signal 19 is connected to an EC (Embedded Controller) 17. The cooling unit detection signal 19 is connected to an EC power supply 25 via a pull-up resistor 18 and is connected to a GND in the interior of the cooling unit 9, which is connected via the connector 8. The EC 17 judges from the voltage value of the cooling unit detection signal 19 whether the cooling unit 9 is connected to the main body 5 of the personal computer. Concretely, when the level of the cooling unit detection signal 19 is high, the signal 19 indicates that the cooling unit 9 is not connected. And when the level of the cooling unit detection signal 19 is low, the signal 19 indicates that the cooling unit 9 is connected.

According to the connection state of the cooling unit 9, the EC 17 sends a signal for setting the CPU operating power supply 20 to the DC/DC converter 15 and a signal for setting the CPU operating frequency 21 to a chip set 16. After receiving the signals, the DC/DC converter 15 and chip set 16 change the CPU operating power supply and CPU operating frequency, respectively.

For example, when the cooling unit 9 is connected, the EC 17 sets the operating power and operating frequency of the CPU in such a manner that the CPU operates at a high speed. Also, when the cooling unit 9 is not connected, the EC 17 sets the operating power and operating frequency of the CPU so that the CPU operates at a low speed in order to ensure that the amount of the heat release is reduced so as to permit the operation of the personal computer without the cooling unit 9.

Figure 4:
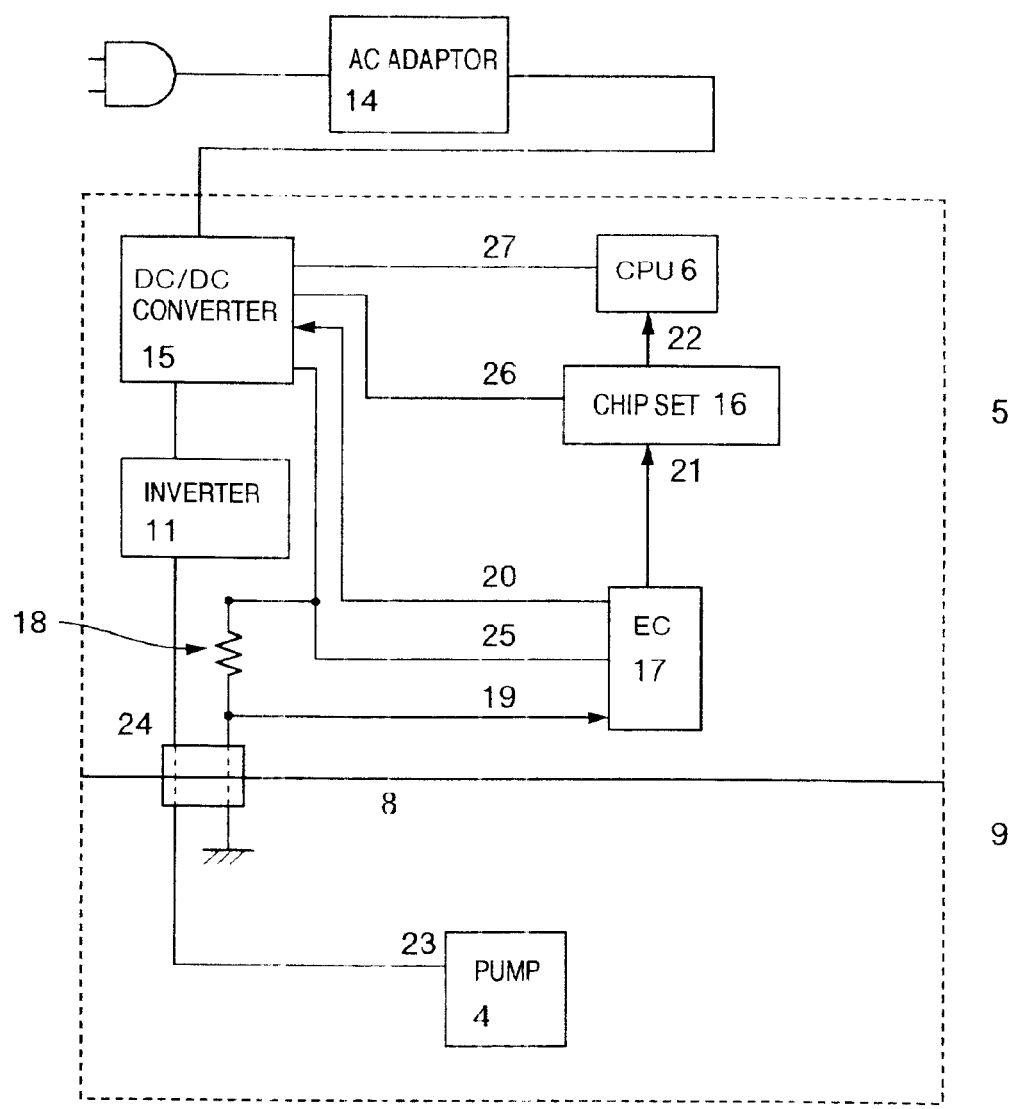
FIG. 4 is a diagram of another electric circuit of a personal computer in the first embodiment of the invention.

FIG. 4 is a diagram of another electric circuit in which the inverter 11 for driving the pump 4 is disposed in the main body 5 of the personal computer, and not within the cooling unit 9. The same effect can be obtained also from this electric circuit.

Figure 5A:
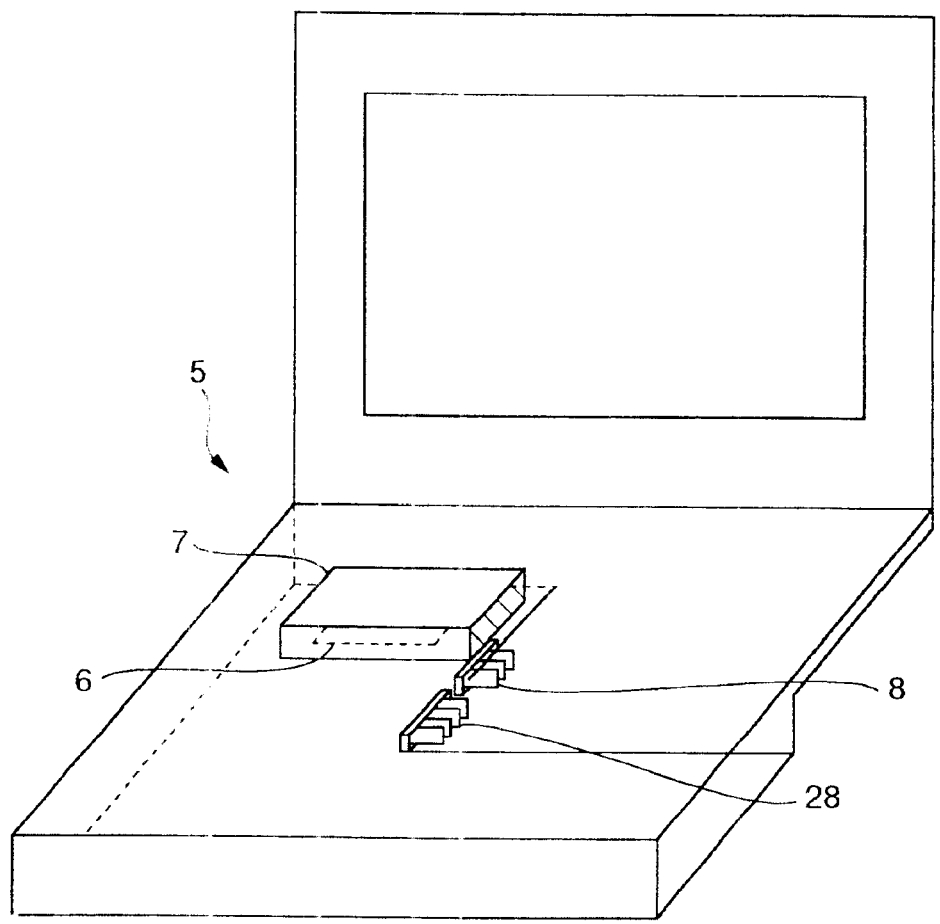
FIG. 5A is a schematic representation of a general structure of a personal computer in which a cooling mechanism using liquid cooling method in a second embodiment of the invention is employed.
Figure 5B:
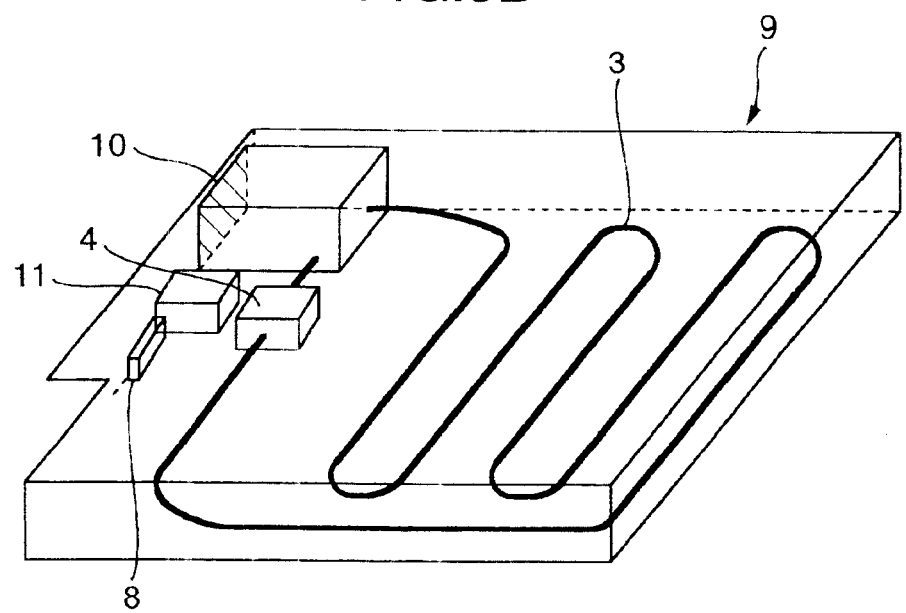
FIG. 5B is a schematic representation of the general structure of a cooling mechanism using liquid cooling method in the second embodiment of the invention.
Figure 6:
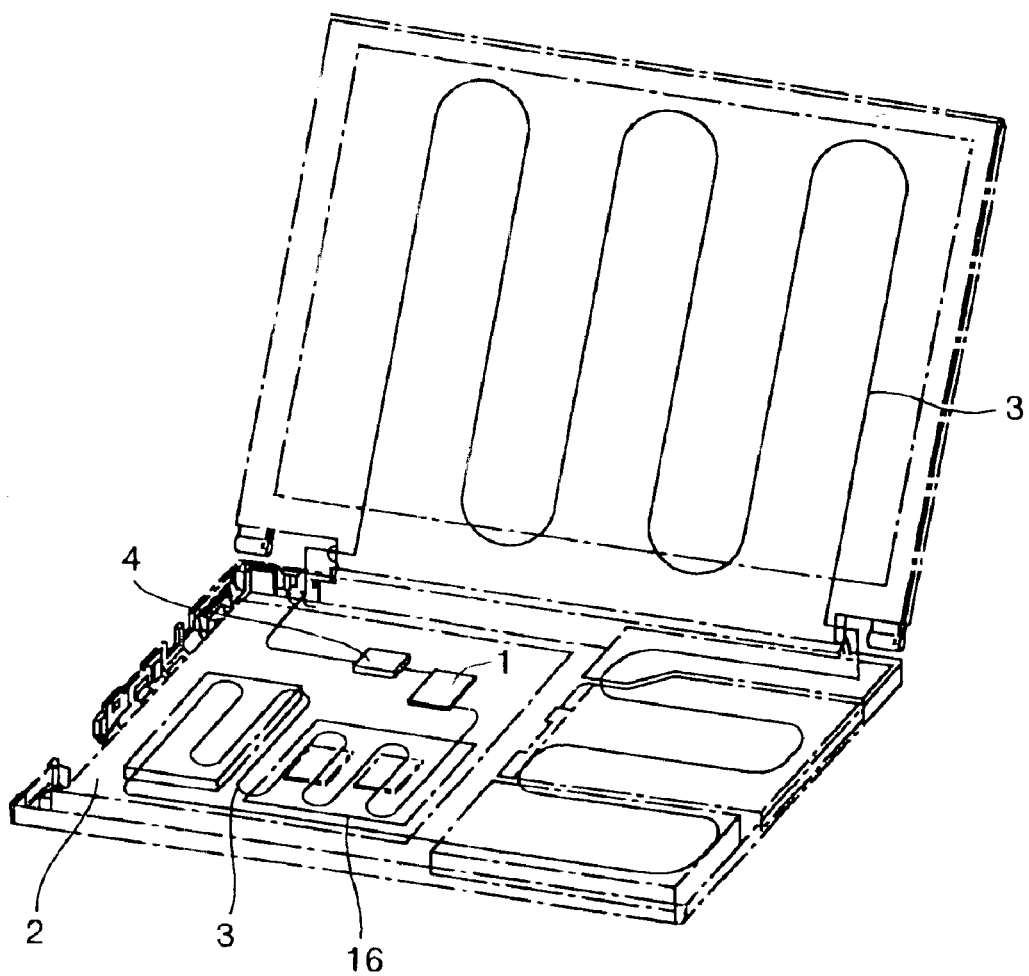
FIG. 6 is a schematic representation of the general structure of a conventional cooling mechanism.

FIGS. 5A and 5B are schematic representations of a cooling structure related to a personal computer in the second embodiment of the invention. In this second embodiment, a cooling unit 9 is adapted to be shaped in such a manner that it allows replacement with a battery pack. The portion of the main body of personal computer that is opposed to a battery connector 28 is cut away so that the battery or the cooling unit 9 can be mounted. The connection to the main body 5 of the personal computer is an exclusive connection of either of the cooling unit 9 or the battery pack.

In this embodiment, a heat-receiving head 7 is disposed on a CPU 6 and the side surface of the heat-receiving head 7 (the hatched portion in FIG. 5A) is exposed to the outside from the main body 5 of the personal computer. A connection head 10 is disposed at the end of the cooling unit 9 in order to permit thermal connection between the side surface of a heat-receiving head 7 and the side surface of the connection head 10 when the cooling unit 9 is connected. The heat-receiving head 7 and connection head 10 are connected together at the respective side surfaces through the same heat-conducting sheet as in the design shown in FIGS. 2A and 2B. An exhaust fan for the forced exhaust of the interior may be installed in the cooling unit 9 as shown in FIG. 5B so as to increase the amount of the heat release from a tube 3.

The control method in this embodiment is the same as described in connection with FIG. 3 and the first embodiment. When the battery pack is connected, a cooling unit detection signal 19 of the connector 8 is not connected to a GND and, therefore, the cooling unit 9 is brought into an unconnected state. At this time, in order to reduce the amount of the heat release so that the personal computer can operate without the cooling unit 9, the CPU operating power and CPU operating frequency are set so that the CPU operates at a low speed.

Also in the second embodiment, it is needless to say that as in the first embodiment, the prevention of the moisture permeation to the main body 5 of the personal computer and the great ease with which the disassembly and assembly of the main body 5 of the personal computer are realized. Furthermore, in the first embodiment the thickness of the personal computer increases when the cooling unit 9 is connected, whereas in the second embodiment the cooling unit 9 is mounted on the personal computer in an exclusive relation to the battery pack and, therefore, it is possible to keep the outside dimensions of the personal computer almost the same. Incidentally, it is also possible to allow the cooling unit in such a manner that the cooling unit has the same outside shape as a drive unit such as a CD-ROM, and other extension units in addition to the battery pack.

As is apparent from the first and second embodiments, the invention is characterized by the design that the cooling mechanism using liquid cooling method is divided into a portion that temporarily absorbs the heat generated from the CPU 6 and does not contain a cooling liquid, i.e., the heat-receiving head 7 in these embodiments, and a portion that circulates the cooling liquid and performs thermal diffusion, i.e., the cooling unit 9 in these embodiments. For the shape of the cooling unit 9, the first embodiment discloses a shape that permits connection to the undersurface of the main body 5 of the personal computer, and the second embodiment discloses the same shape as the battery pack. However, various appropriate shapes may be adopted in addition to the shapes. For example, it is possible to design the cooling unit in such a manner that the cooling unit has the same outside shape as a drive unit such as a CD-ROM, and other extension units in addition to the battery pack. The same applies also to the shape of the heat-conducting part.

According to the invention, therefore, it is possible to protect the main body of the personal computer, on which the cooling mechanism using liquid cooling method is mounted, from moisture permeation from the cooling mechanism using liquid cooling method and unexpected leakage of cooling liquid.

Furthermore, even when the cooling mechanism using liquid cooling method that requires a complex structure is mounded on the main body of the personal computer, it is possible to design the cooling unit as a separate structure, thereby making disassembly and assembly easy.

It should be further understood by those skilled in the art that the foregoing description has been made on embodiments of the invention and that various changes and modifications may be made in the invention without departing from the spirit of the invention and the scope of the appended claims.

What is claimed is:

1. A personal computer comprising:

a main body including a display part, a CPU and a heat-receiving head connected to the CPU for enabling heat release from the CPU; and a cooling unit having a container including a tube, a cooling liquid received in the tube, a pump for circulating the cooling liquid, and a connection head connectable to the heat-receiving head;

wherein the cooling unit is separably connectable to the main body so that heat from the CPU is released to the cooling unit through a connection between the connection head and the heat-receiving head.

2. A personal computer according to claim 1, further comprising a controller which detects a cooling unit detection signal indicating whether the cooling unit is connected to the main body, the controller enabling control so that an amount of the heat release from the CPU is reduced when the cooling unit is not connected to the main body in comparison with an amount of the heat release from the CPU when the cooling unit is connected to the main body.

3. A personal computer according to claim 2, wherein the controller is mounted on the main body.

4. A personal computer according to claim 2, wherein the controller controls in accordance with the cooling unit detection signal at least one of a power supply for operating the CPU and an operating frequency of the CPU so that the amount of the heat release from the CPU which operates at a low speed when the cooling unit is not connected to the main body is reduced in comparison with the amount of the heat release from the CPU which operates at a high speed when the cooling unit is connected to the main body.

5. A personal computer according to claim 1, wherein the heat-receiving head is arranged at a lower surface of the main body, and the connection head is arranged at an upper surface of the cooling unit, so that the heat-receiving head and the connection head are opposed to each other vertically when the connection head is connected to the heat-receiving head to release the heat from the CPU to the cooling unit.

6. A personal computer according to claim 1, wherein the main body includes a power source which supplies power from the main body to the cooling unit for driving the pump when the cooling unit is connected to the main body.

7. A personal computer according to claim 1, wherein the main body includes a portion on which either of the cooling unit and another unit is mountable.

8. A personal computer according to claim 1, wherein the cooling unit is configured so as to prevent the cooling liquid from entering the main body.

9. A personal computer according to claim 8, wherein the main body includes a power source which supplies power from the main body to the cooling unit for driving the pump when the cooling unit is connected to the main body.

10. A personal computer according to claim 8, wherein the cooling unit has a configuration enabling a mating connection with a configuration of the main body.

* * * * *